United States Patent [19]
Roberts et al.

[11] 3,859,135

[45] Jan. 7, 1975

[54] METHOD OF FILLING A BATTERY PLATE GRIDS WITH NON-FLOWABLE BATTERY PASTE

[75] Inventors: Maurice Roberts, Hampton-in-Arden; John Derek Harris, Solihull; Roy William Humpage, Solihull; Geoffrey George Crow, Solihull, all of England

[73] Assignee: Joseph Lucas (Industries) Limited, Birmingham, England

[22] Filed: Mar. 27, 1973

[21] Appl. No.: 345,293

Related U.S. Application Data

[63] Continuation of Ser. No. 39,126, May 20, 1970, abandoned, and a continuation-in-part of Ser. No. 814,563, April 9, 1969, abandoned, which is a continuation-in-part of Ser. No. 704,011, Feb. 8, 1968, abandoned.

[30] Foreign Application Priority Data

Feb. 17, 1967 Great Britain ..................... 7698/67

[52] U.S. Cl. ..................................... 136/27, 136/67
[51] Int. Cl. ......................................... H01m 35/26
[58] Field of Search .......................... 136/67, 64–65, 136/19; 141/32; 117/DIG. 8; 118/57, 612

[56] References Cited
UNITED STATES PATENTS

| | | | |
|---|---|---|---|
| 2,479,603 | 8/1949 | Chubb et al. ......................... | 136/67 |
| 3,269,863 | 8/1966 | Helms ............................... | 136/65 X |
| 3,287,164 | 11/1966 | Arrance .................................. | 136/9 |
| 3,310,438 | 3/1967 | Huffman et al. ................... | 136/65 X |
| 3,436,803 | 4/1969 | Sarnoff ............................... | 29/432.2 |
| 3,461,942 | 8/1969 | Hoffman et al. ..................... | 164/49 |
| 3,542,600 | 11/1970 | Pohlmann ....................... | 136/120 R |

FOREIGN PATENTS OR APPLICATIONS

305,302    2/1929    Great Britain ....................... 136/67

*Primary Examiner*—Anthony Skapars
*Attorney, Agent, or Firm*—Holman & Stern

[57] ABSTRACT

In the manufacture of battery plates for lead-acid batteries, paste is placed on a grid in the usual way, but instead of being forced through the grid by a pasting machine as is conventional, vibrational energy, preferably ultrasonic energy is applied to the paste to convert the paste from its normal non-flowable form to a flowable form.

14 Claims, 7 Drawing Figures

METHOD OF FILLING A BATTERY PLATE GRIDS WITH NON-FLOWABLE BATTERY PASTE

This invention relates to the manufacture of battery plates for lead-acid batteries, and is a continuation of application Ser. No. 39,126, filed May 20, 1970, now abandoned, which is a continuation-in-part of our application No. 814,563, filed April 9th 1969 now abandoned, which in turn is a continuation-in-part of Application No. 704,011, filed February 8th, 1968 now abandoned.

Lead-acid batteries have been known since last century, and the basic construction of such batteries with plates in the form of pasted grids has been unchanged for many years. Such a lead-acid battery consists of a number of plates, each of which is manufactured by applying a paste to a lead grid. It will of course be realised that pure lead is not a satisfactory material for a grid, and must be strengthened in some way. Typically this strengthening is effected by adding antimony to the lead, but naturally there are many other ways in which the lead grid can be strengthened sufficiently to make it satisfactory for use. Such strengthening is well-known, and forms no part of the present invention, but it is to be understood that references to lead in this specification are not intended to convey pure lead, but that the term lead is being used in the sense that it is used throughout the battery industry as meaning suitably strengthened lead.

There are of course positive and negative plates in a lead-acid battery, and these plates are formed starting with a grid in the form of a rectangular framework having an integral lug extending therefrom, the frame members of the grid being interconnected by integral ribs, interstices being defined between the ribs and the frame members. A paste is applied to the grid, and the plates are then subjected to an operation known as forming to convert the paste either to lead dioxide, in the case of a positive plate, or to spongy lead in the case of a negative plate.

Throughout the world, there are mainly two types of machine utilised for pasting grids, namely the fixed orifice type and the belt type pasting machine. The Lund machine, which is an example of the fixed orifice type, has a hopper containing the paste, and at the base of the hopper are a series of rollers which produce a strip of paste of predetermined thickness. This strip of paste is fed between a pair of rollers rotating about horizontal axes, and the grids are also fed between the rollers. The rollers apply pressure to the grid and paste to force the paste into the grid, which then is passed onto the next stage of the process. In the belt type machine, of which the Winkel machine is an example, the same basic mechanical action is used to force the paste into the grid, but the grids are fed horizontally on a belt under a roller. It will of course be appreciated that both these types of machine are complex and capable of numerous modifications, as will be well-known to those skilled in the art.

These two basic machine types have been in use for at least thirty five years, and produce satisfactory results. Indeed, so far as we are aware the plates in every lead-acid battery in the world will have been pasted either by hand (where only small quantities are being made) or by one or other of the two basic machine types mentioned. However, in recent years there has been considerable pressure on battery manufacturers to improve the basic lead-acid battery. In particular, ways have been investigated of reducing cost by utilising thinner grids, or possibly even synthetic resin grids coated with conductive material. The grid is a substantial portion of the total cost of the battery, and so savings in this area can be extremely beneficial. However, the great problem in reducing grid thickness has been the pasting of the grid, because both the basic machine types apply considerable mechanical force to the grid, so that the strength of the grid must be sufficient to withstand the forces involved in pasting. It is of course theoretically possible to make an extremely thin grid which at the same time is very strong and will withstand the forces, but this defeats the objective, because by making the grid extremely strong its price is automatically increased. What is required is a thinner grid than usual which is not damaged by the mechanical forces involved during pasting, and this has not proved possible utilising the basic machine types.

With this in mind, we have endeavoured to find a completely new way of pasting a battery plate grid, going away completely from the conventional mechanical approach to the problem. If a conventional lead-acid battery paste is placed upon a lead grid, the paste will merely rest on the grid, and the physical nature of the paste is such that there is no question of any flow taking place into the grid, so that apparently considerable mechanical force is necessary to force the paste into the interstices of the grid. The physical nature of the paste is a property of its consistency and texture, as will be explained in detail later. To our surprise we have found that if we introduce vibrational energy into the paste, the nature of the paste changes so that the paste flows into the grid. In this way, extremely satisfactory pasting can be achieved, without applying any substantial force to the grid, so that thin weak grids can readily be pasted by this method. Our work has been primarily directed to the utilisation of ultrasonic energy, because ultrasonic energy can be applied to the paste readily using commercially available equipment, and of course it cannot be heard by personnel, so that there is no inconvenience involved in utilising this method. However, the concept of the invention is so important that it is worth while considering whether sonic energy can produce the same effect, and our work has shown that this is quite possible, although of course the noise level is somewhat undesirable. Even so, this invention represents an extremely important step forward in the lead-acid battery field, and so our invention does embrace the use of sonic energy, with suitable protection being provided for personnel as and when required. Also, although our primary endeavours have been to utilise thinner grids, the method of the invention works so well, that it is of considerable value even when used with grids of conventional thickness, as will be explained in more detail in the embodiment.

It may be wondered why the problem of pasting of thin grids cannot be overcome simply by adding more water to the paste thereby providing a thinner paste than usual, so that less mechanical force is necessary to paste the grid. In this respect it must be realised that there is inevitably, in any large-scale battery manufacturing plant, considerable capital involvement in the equipment for manufacturing the batteries. On fixed orifice and belt type machines it is not possible to use a paste containing significantly more water than is presently used, because both these machine types require specific formulations of paste which have been developed over a number of years, and which involve considerable knowhow. Even a minor change in the formulation of the paste would be a very serious matter requiring considerable experiment over a lengthy period of time. The reason for this is not only that specific paste formulations produce satisfactory results in the two basic machine types. Another major factor is that any change in the formulation of a paste can have a significant effect on the subsequent performance of the battery plate in a battery in terms of life, capacity or other basic parameters thus, it would be totally impractical, even if it should be theoretically possible, to develop a new pasting machine which can utilise a thinner paste, and then to have to develop the thinner paste which is suitable for use in that machine and also gives a satisfactory plate. Where the present invention is so successful, is that the physical nature of the paste is not important, and the basic paste-types presently utilised in fixed orifice and belt-type pasting machines can readily be pasted onto a grid using vibrational energy.

The invention also has a second aspect, because it has been found that battery plates manufactures in accordance with the method of the invention have considerably improved properties. The reasons for this, and a comparison of the new battery plates with the prior art will be explained in more detail in the description.

We are aware that there have been proposals in the past for using what can loosely be termed vibrational energy in the manufacture of battery plates. Thus, in British specification 305,302, a grid is placed on a support, and a layer of paste is then placed on the grid. The paste is forced into the grid by a percussive action using a hammer. This of course is a purely mechanical action, and a machine working on this principle has never, so far as we are aware, been manufactured because it offers no advantages over the conventional fixed orifice and belt type machines. The percussive action will of course force the paste into the grid, but there will be a substantial force exerted on the grid, so that the apparatus is totally unsatisfactory for weaker grids. The difference between this proposal and the present invention is that in accordance with the present invention vibrational energy is introduced into the paste causing the physical nature of the paste to change so that the paste is converted from a non-flowable form to a flowable form and flows into the grid without substantial mechanical force being applied to the paste to cause it to flow into the grid. This is the essence of the invention, namely that the vibrational energy changes the paste from its usual non-flowable form to a flowable form, rather than applying any mechanical force to the paste to force it into the grid. The lack of a mechanical force acting through the paste on the grid is what enables weaker grids to be utilised.

Another proposal is made in U.S. Pat. No. 3,287,164, which relates to alkaline batteries of the pasted type. In this patent it is suggested that a porous conductive metal matrix should be impregnated with paste by vibrating the paste. It might be thought that this patent gives a solution to the problem of using weaker grids, but in fact although the lead-acid battery and the alkaline battery are both well-known forms of electrical power, the techniques involved in making them are so different that one field rarely impinges on the other. Although in patent 3,287,164 no exact details are given of the type of paste used, this merely indicates that the paste is a conventional paste for an alkaline battery of the pasted type and such a paste is essentially a flowable paste, using this term in its strict rheological form. Thus, a flowable material is defined rheologically by specifying that if two blobs of the material are placed side-by-side on a surface, they can by shaking the surface, be caused to flow into one another to form a single blob. This is the case with the sort of paste used in U.S. Pat. No. 3,287,164 where no difficulties exist in pasting grids. Thus, the elaborate fixed orifice and belt type machines are never used with such batteries. There is no difficulty in introducing the paste of such a battery into its grid, and in fact the paste can merely be spread into the grid rather like spreading soft butter on bread. It is for this reason that no emphasis is placed on the way in which the paste is introduced into the porous matrix in U.S. Pat. No. 3,287,164, and in particular it is not explained what is meant by vibrating the paste, or how these vibrations are to be introduced. Certainly, there is no question of the vibrations in any way changing the paste from a non-flowable form to a flowable form, and so allowing it to flow into the porous matrix because the paste in the earlier proposal is already flowable. In considering whether an expert, seeing U.S. Pat. No. 3,287,164 would realise that here existed a solution to the problem of using weaker grids in lead-acid batteries, it must be realised immediately that the paste used in a lead-acid battery is anything but flowable, again using the term in its strict rheological sense. For this reason, it is inconceivable that an expert seeing U.S. Pat. No. 3,287,164 would even think of using the vibrational technique on a lead-acid paste, because he would realise that the leadacid paste is a non-flowable paste, and would not expect the vibrations to have any effect whatsoever. It is a matter of considerable surprise to us that the vibrational energy applied to the paste changes the physical nature of the paste to cause it to flow into the grid.

An example of the invention is illustrated in the accompanying drawings in which.

For convenience, the description will be divided into two parts corresponding to the manufacture of the battery plate and to the properties of the battery plate.

MANUFACTURE

The preferred method is best explained with reference to FIG. 1. Grids 21 are fed by any convenient known means to a conveyor 22. Above the conveyor 22 is a device 23 for supplying paste to the grids 21. The grids with the paste on their upper face are then fed onto a support 24 located beneath a sonotrode 25, (also known as a work horn), the ultrasonic energy from which causes the paste on each grid 21 to flow into the interstices of the grid. In the example shown, it is desired to overpaste both sides of the grid, and so the support 24 is in the form of a bar with channels extending around the upper part of its circumference, the arrangement being such that the paste flows into and through the grid and so into the channels, but leaves the channels as the grid leaves the support 24, so that there will be ribs of paste extending longitudinally on the lower face of each grid 21. The grids are inverted and fed to a further conveyor 26 which feeds the grids to a further support 27 in the form of a plain bar, the support 27 being positioned below a second sonotrode 28 which smooths the ribs of paste so that both faces of the grid are overpasted. The grida are then fed to an oven 29 and skin dried in conventional manner.

Figure 1:
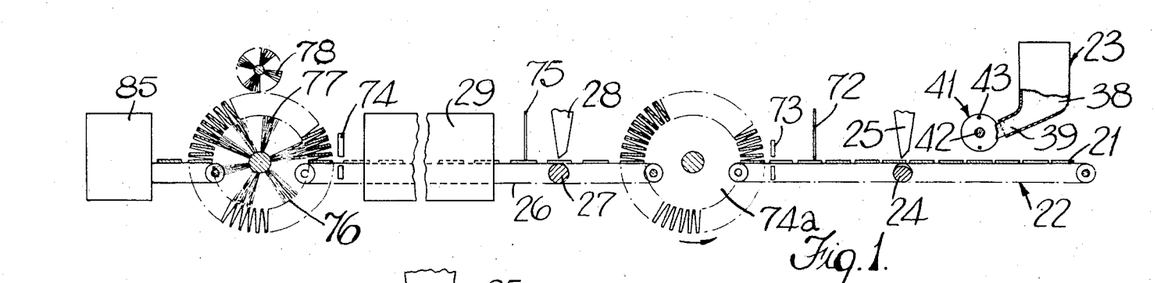
FIG. 1 is a schematic flow sheet.
Figure 2:
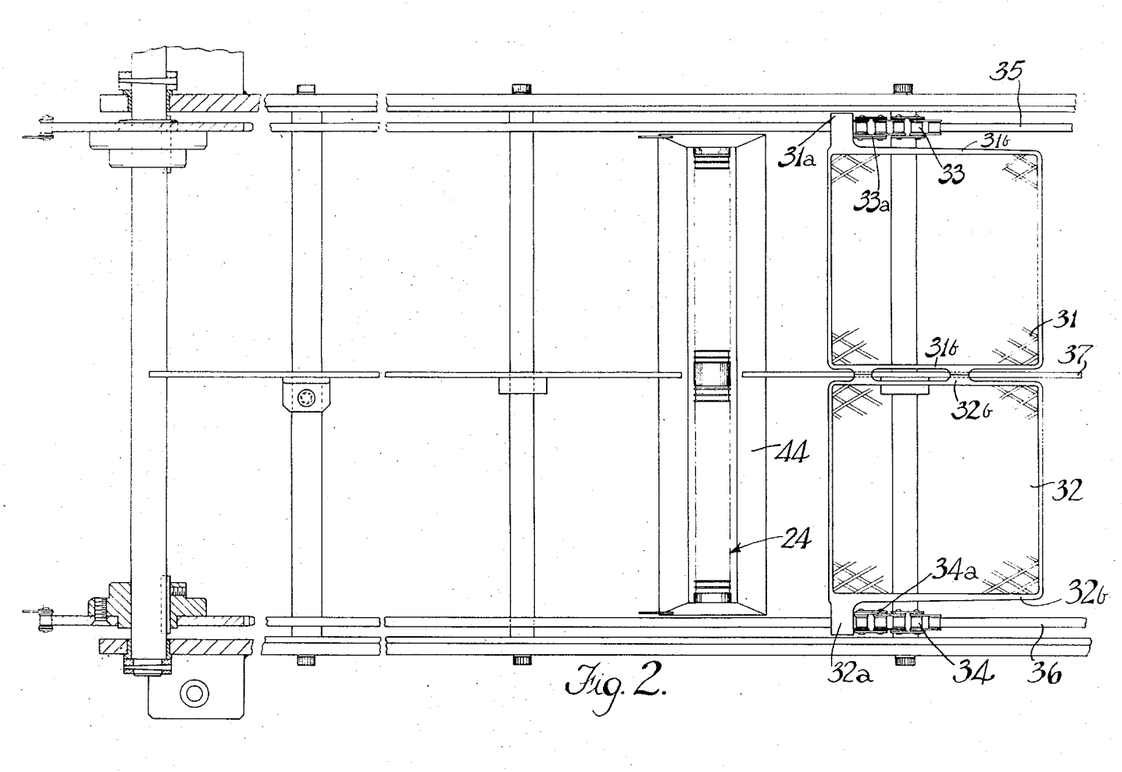
FIG. 2 is a fragmentary plan view of part of a conveyor shown in FIG. 1.

The grids used are shown at 21 in FIG. 1, and at 31 and 32 in FIG. 2, where a pair of interconnected grids are to be pasted simultaneously. Although the grids can be entirely conventional some explanation of what is meant by a conventional grid follows.

A grid is a framework with intersecting ribs which supports the active material of a plate i.e. the paste after it has been formed to a positive or negative condition. The intersecting ribs are so positioned and are of such a shape and size as to ensure that the active material is supported and retained in the grid and prevented from falling out under conditions likely to be experienced by the battery in use. Thus, by way of example, a lead-acid battery grid for use in a road vehicle must be able, both by virtue of its intimate contact with the active material and the distribution and mass of the lead of which it is composed, to collect and transmit electric current without appreciable voltage loss. This is particularly important in positive plate grids.

It is usual to cast grids in an antimonial lead alloy, containing from 2 to 12% antimony with or without other minor alloying elements such as tin, arsenic, copper and silver, with a current collecting lug situated on the upper edge of the grid frame as shown at 31a and 32a. It is also usual to cast on two short feet on the bottom edge of the grid frame which rest on supports situated in the base of the battery container. The two feet are offset from a vertical centre line so that feet on positive and negative plates, when assembled as a two volt group, are not in juxtaposition. These feet are used to interconnect the pair of grids temporarily as shown in FIG. 2.

Typical sizes of conventional grids for vehicle batteries are:
 Overall Width - 60mm to 200mm
 Overall Height - 60mm to 230mm
 Interstices - Width 9.5 -20.6mm
  Depth - 3.2 - 5.6mm
 overall Thickness - 1mm to 6.5mm In the United Kingdom the most common size of vehicle battery grid is 119mm high, 113mm wide and 1.6mm thick, but in the United States, the usual size is somewhat larger, typically 120mm high, 145mm wide and 1.75mm thick. The proportions of the overall area of a grid which consists of holes can vary, but is in the region of 40 to 70%.

The description above refers to conventional grids, but successful results can be achieved with a wide variety of grids. For example, dispersion strengthened lead grids can be used, whether such grids are formed by rolling, stamping from sheet or any other technique, and whether the ribs of the grid are at right angles or extend diagonally with respect to the frame of the grid. Successful results can also be achieved with synthetic resin grids coated with conductive material. One such grid had a thickness of the order of 1.0 to 1.25mm, and was pasted with a conventional paste by the method of the invention without any difficulties. An attempt was then made to paste an exactly similar grid on a Lund machine. Not only was this attempt unsuccessful, but the grid disintegrated so completely that no part of it could be traced. This experiment gives some indication of the tremendous step forward achieved by the invention. In the past, a number of factors have been paramount in grid design, and one all-important factor has inevitably been whether the grid could be pasted satisfactorily. Using the invention, this factor becomes almost unimportant. A wide range of grids can now be pasted, examples (by no means exhaustive) being an open wire mesh, either woven or in the form of expanded metal, or metal stands fastened together by any convenient means; another possibility is metal strands or wires held together by bracing strips of synthetic resin or other suitable material.

The paste used is a conventional lead-acid battery paste prepared by mixing lead oxide, metallic lead particles, water and sulphuric acid. In some cases additives may be included in the paste, to improve its properties, but these additives do not affect the situation in so far as the present invention is concerned, and are in any case well known. It is to be understood that references to the paste prepared by mixing the four basic ingredients is not intended to exclude paste having other additives. The properties of a lead-acid paste have been discussed in detail in a booklet "Paste Preparation and Plate Control" by J. F. Dittmann and H. R. Harner, published by the Eagle-Picher Company of Cincinnati. These workers point out that there are two separate physical properties of the paste which are of importance, namely the consistency and the texture. The consistency of a paste refers in the industry to its relative softness. This softness can be controlled by the proportions of water and acid added to the oxide. Less water and greater acid addition will cause the paste to become stiffer, whilst for the same total volume of water plus acid, an increase in water will cause the paste to become softer. Various consistencies can be obtained, within limitations imposed by the type of oxide used, the type of mixing apparatus, and the pasting machine that is to be used eventually. As pointed out in the booklet referred to, a convenient way of measuring consistency has been devised by Globe Union Inc., using the depth to which a plunger falling under its own weight penetrates the paste as a measure of the stiffness of the paste. Penetration values are given on a scale ranging from 18 to 42, called Globe Numbers and the lower the value, the stiffer the paste. The usual values for use in a fixed orifice type machine are typically from 22 to 28, whilst in a belt type machine it is generally accepted that values from 18 to 24 are to be preferred.

In addition to consistency, it is also necessary to consider the texture of the paste. Paste texture, as pointed out in the booklet, differs from consistency in that it is related to the smoothness of the paste mass. This concept is one that is readily understood by workers in the field, although it is extremely difficult to express quantitatively. If a leadacid battery paste is rubbed between the finger and thumb particles can be felt and the paste has what is known in the industry as a crunchy feeling. The degree of crunchiness of a paste, that is to say its texture, varies markedly, and in particular pastes of the same consistency on the Globe scale can vary substantially in texture.

Although control of the consistency of a paste is not too difficult, control of texture is extremely complicated. Factors that can affect the texture are the total amount of acid and water added, the speed at which the acid is added, the length of time for which mixing takes place, the way in which the paste is actually mixed and the characteristics of the various ingredients. Many of these factors will not affect consistency at all, and this makes it very difficult to manufacture a paste that is satisfactory for use in the fixed orifice and belt type machines, and this is a major reason why know-how in the manufacture of paste is such a valuable attribute to a manufacturing company. It is quite possible for an experienced company in this field to set up equipment, all of which is well-known, to produce a paste having the required consistency, and then to find that it is quite impossible to paste a grid, because they do not have the required know-how in paste texture.

The beauty of the present invention is that the texture and consistency of the paste are not at all important since the use of vibrational energy causes the paste to flow through the grid, and although it is physically impossible to measure precisely changes in consistency, and even more so changes in the nebulous factor of texture, it would appear that the vibrational energy alters the nature of the paste such that these two factors no longer become of importance, and the paste flows without difficulty into the grid.

In one specific example, approximately 100 grams of paste was applied to a grid having the dimensions given earlier, namely 119mm high, 113mm wide and 1.6mm thick. The paste had a penetration of 24 Globe units, and the sonotrode 25 had a frequency of 20 kilocycles per second. The frequency of the sonotrode is not critical, and neither for that matter is its amplitude. All that is required is that the frequency should be sufficiently high, for a given amplitude, to transfer energy into the paste to cause it to flow. The frequency is dictated primarily by commercially available ultrasonic tools, but in addition sonic frequencies can be used provided the noise problem is overcome, either by building sound-proof booths, or alternatively by providing personnel with protective head gear. The preferred amplitude is 0.05mm, but this can be varied substantially, typically in the range 0.0025 to 0.25mm. The power available at the sonotrode is also not critical provided the sonotrode, which of course, dips into the paste, is not damped by the paste. A 600 watt sonotrode has given satisfactory results. The fixed orifice and belt type machines can paste grids at about 120 per minute, and this figure can easily be exceeded using the ultrasonic method, where pasting has been effected at a rate as high as 240 per minute. In fact, normally speaking the limitation on the rate at which the grids are pasted is dependent on other apparatus in the factory, because clearly it is pointless to paste grids at such a high rate that they cannot be fed quickly enough onto the pasting station, or removed quickly enough onto the next station. If extremely high rates of manufacture are required, then it is preferred that the arrangement shown at 74a for inverting the grids is replaced by a different arrangement which can operate more rapidly. By way of example, the conveyor 22 can be shaped so that an inclined support bearing on the mid-point of a double grid allows the grid to move from a horizontal position to a vertical position while still being carried along on the conveyor. A further inclined surface then engages the mid-point of the double grid to lift the grid to a horizontal position again, so that the grid is now inverted, but is on the same conveyor, and is then fed under the sonotrode 28. This enables the pasting rate to be substantially increased.

The preferred method disclosed is, of course, capable of considerable variation. By way of example only, further paste can be added to each grid 21 if required just before the grid reaches the sonotrode 28. If it is not required to overpaste on both sides of the grid, or if it is required to paste on one side only, then the ribbed bar 24 can be replaced by a plain bar, and satisfactory results can be achieved without the inversion and further operation by the sonotrode 28. The paste could also be placed on the grids by hand. It should also be noted that the ribs of the bar 24 are merely to provide support for the grids, and if the grids are self-supporting the ribs are not required. In this case overpasting on both sides of the grid could be achieved in a single operation by having the grids spaced from a plain bar 24.

Further aspects of the method in accordance with the invention will become apparent from a detailed description of the specific apparatus shown. The apparatus disclosed is intended for pasting lead grids which are cast in conventional manner in the form of a pair of grids joined at their bases, the lugs extending from the tops of the grids opposite the bases. Such a pair of grids is shown at 31 and 32 in FIG. 2, with their lugs at 31a and 32a respectively. The lugs 31a and 32a rest on a pair of roller chains 33, 34 the rollers of the chains running on supports 35, 36 forming part of the frame of the machine. The bases of the grids 31, 32 rest on a rail 37 which also forms part of the frame of the machine, and the grids are driven by fingers 33a and 34a upstanding from the chains respectively and engaging the lugs. The spacing between adjacent said fingers is slightly greater than the width of a grid. It will be appreciated that the chains 33, 34 can be driven in any convenient manner, and with their associated supports constitute the conveyor 22 shown in FIG. 1.

Reverting to FIG. 1, the device 23 is in effect a combined paste mixing and paste feeding station. The constituents of the paste are inserted into a hopper 38 containing any convenient form of mixer (not shown), and the paste is extruded from the mixer 38 through a nozzle 39 in the form of a strip of paste, conveniently of rectangular or elliptical cross section. Mounted forwardly of the nozzle 39 is a rotary cutter 41 which consists of a central shaft 42 extending between end plates which carry a pair of wires 43 extending parallel to the shaft 42. The arrangement is such that as the shaft 42 rotates, each wire 43 in turn cuts into the extruded paste, the effect being that each grid in turn is coated with flakes of paste over its upper face. The relative speeds of the various components can be adjusted to give the required amount of paste on each grid, but if for any reason extreme accuracy is required, some form of sensing device can be incorporated to determine the amount of paste on each grid and adjust the relative speeds of the various components to give the exact amount required.

Figure 3:
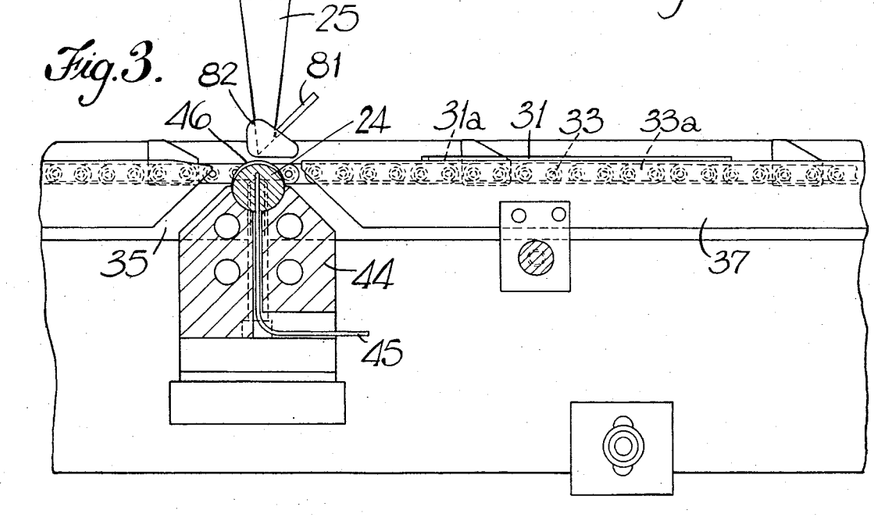
FIG. 3 is a part-sectional view through the conveyor and sonotrode.

Referring now to FIGS. 2 and 3, the bar 24 is formed from steel, and is carried by a mounting block 44. Super heated steam is fed by way of a pipe 45 through the mounting block 44 to the interior of the bar 24 to be heated to facilitate removal of the plate from the bar.

It will be appreciated that prior to the pasted grids being formed, it is essential that they remain in their pasted condition for a length of time sufficient to allow the chemical actions taking place within the paste to become complete. A parameter which influences the efficiency of this process, termed "conditioning" is the moisture content of the paste, and while it would seem the paste is being dried as the pasted grid passes over the heated support, in fact the time spent by the paste on the support is so small that the liquid at the paste/support interface is vaporised thereby preventing any sticking of paste to the support as the pasting procedure takes place, thereby retaining the required moisture content within the plate. The temperature to which the bar must be heated is not critical, as long as it is high enough to prevent sticking. The faster grids are pasted the higher the temperature must be, and a satisfactory value can simply be determined by experiment. We have found that for a pasting speed of 60 grids per minute a temperature of 120°c. is satisfactory, while for a pasting speed of 120 grids per minute, 300°c. is satisfactory.

If necessary a jet of air could also be used to facilitate removal. The upper half of the bar 24 is formed throughout its length with circumferentially extending semi-circular channels 46 having a maximum depth at the uppermost part of the bar. Other forms of heating could be used, for example electrically heated cartridges mounted in the block 44.

Figures 4, 5:
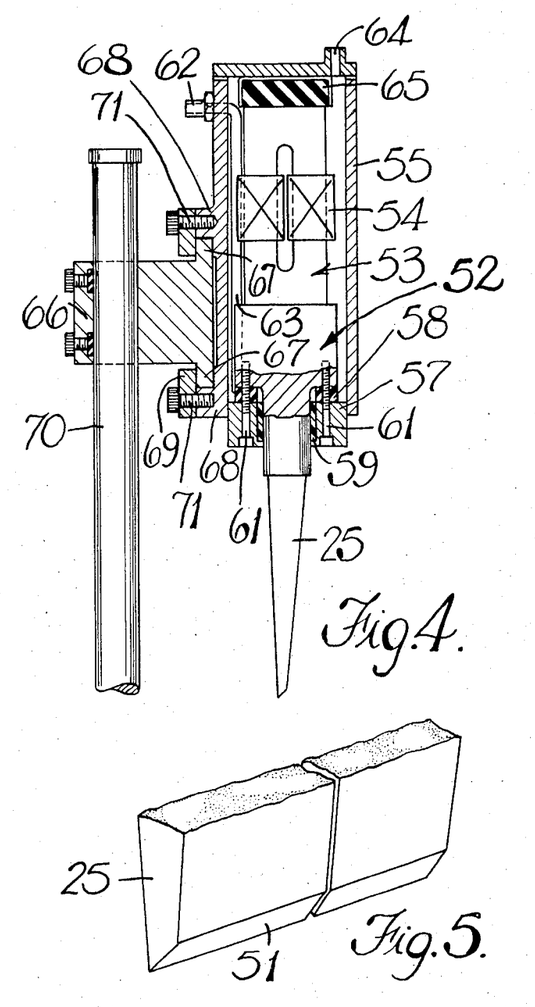
FIG. 4 is a sectional view of an ultrasonic tool of which the sonotrode forms part.
FIG. 5 is a perspective view of the sonotrode

The sonotrode 25 mounted above the bar 24 is shown in perspective in FIG. 5. It will be noted that in the preferred form the sonotrode has an inclined face 51 which is presented to the grids as they are traversed past the sonotrode the purpose of the face 51 being to guide the paste beneath the sonotrode.

While the tip of the sonotrode dipping into the paste may present a finite area to the paste, it has been found that a knife or slightly rounded edge, hereafter referred to as a sharp edge, is preferred, so providing an efficient means for introducing vibrations into the paste while imposing little loading on the equipment providing the vibrations.

It is found preferable for the face 51 to present an angle of between 30° and 45° to the horizontal. It may be desirable to have the axis of the sonotrode at an angle other than 90° to the direction of movement of the grid, but the face angle of 30° to 45° would still preferably be retained. The sonotrode 25, as shown in FIG. 4, forms part of an ultrasonic tool including in addition to the sonotrode 25 a velocity transformer 52 and a transducer 53 including an energising winding 54. The tool is mounted in a container 55 with the upper surface of the transducer 53 bearing against a rubber block 65 at the top of the container, the lower part of the container being closed by a mounting block 57. Between the mounting block 57 and the velocity transformer 52 is a further rubber pad 58, whilst acting between the block 57 and a further part of the velocity transformer of reduced section is a mounting bush 59 the purpose of which is to mount the velocity transformer. The bush 59 is formed from low energy absorbing material, for example p.t.f.e., and its purpose is to mount the lower end of the tool whilst permitting the tool to be adjusted axially, without the necessity of having a rigid mounting sited at a nodal point. In other to provide for fine adjustment of the sonotrode 25 with respect of the bar 24, bolts 61 are provided with a sliding fit in the block 57 and extend through holes in the annular block 58 into screw fitted engagement with the velocity transformer 52, so that by adjusting the bolt 61 the position of the sonotrode 25 with respect to the block 57 can be accurately determined. The tool is water cooled, and for this purpose there is provided a water inlet 62 from which water is fed through a tube 63 extending to the lower part of the casing 55, the water leaving the casing by way of an outlet 64 at the upper end of the casing.

The casing 55 is mounted for movement in a vertical plane to give coarse adjustment of the position of the sonotrode 25, and is also mounted for movement in a lateral direction across the grid to be pasted. It should be noted that in order to paste the double grid referred to previously, four ultrasonic tools are used. The pairs of ultrasonic tools are similar, and so only one pair will be described. The reason for using a pair of sonotrodes side by side for a grid is that commercially available sonotrodes are not sufficiently wide to cope with grids of the dimensions previously indicated. The sonotrodes form part of separate tools, and it is for this reason that the sonotrodes 25 must be accurately positioned so that the grid when pasted, will have the same level of paste on the two halves, corresponding to the two sonotrodes respectively. A p.t.f.e. shim can be provided between adjacent surfaces of the sonotrode in a pair if necessary.

In order to mount the casing 55, there is provided a pair of pillars 70 on which is mounted a vertically movable slide 66. The slide 66 has at its forward end a pair of flanges 67 which are trapped between the casing and mounting plates 69 which are secured to the flanges 68 on the casing by bolts 71. The casing 55 can be moved vertically on the pillars 70, and by releasing the bolts 71 lateral movement of the casing can be obtained.

Although the transducer of the example is shown as magnetostrictive it will be appreciated that a piezoelectric transducer would be equally suitable.

Reverting now to FIG. 1, the grids leave the sonotrode 25 still on the conveyor 22, and pass beneath a heated doctor blade 72. The purpose of the blade 72 is to smooth the small ridge of paste resulting from the inevitable small pacing between the pair of sonotrodes 25 acting on a grid. After passing the blade 72, the grids are fed past a sensing head 73 to a rotary device 74a which inverts the grids and feeds them to the conveyor 26. Movement of the device 74a is controlled by the sensing head 73. The conveyor 26 feeds the grids onto the bar 27 which has no channels, and whilst on the bar 27 the sonotrode 28 which conveniently forms part of an ultrasonic tool of the same form as the tool including the sonotrode 25, smooths the ribs of paste which were formed as a result of the channels in the bar 24. There will, of course, be a pair of sonotrodes 28, and after leaving the bar 27 the conveyor 26 feeds the grids past a further doctor blade 75 to an oven 29 for drying the paste. When the grids leave the oven 29 they pass a further sensing head 74 and then are fed to a further rotary device 76 having combined therewith an internal rotating brush 77 and an external rotating brush 78. The design of the device 76 is such that the sides of the grid are exposed, and are acted upon by the brushes to remove any excess material from the sides of the grid.

There is no need to brush the sides of the grids which incorporate the lugs, because the edges of the sonotrodes above their sides are protected from paste spreading beyond the edges 31b, 32b shown in FIG. 2 by plates 32 (FIG. 2) fixed in a vertical plane relative to the machine, but spring loaded into engagement with the sonotrode in any convenient manner. The vertical position of each plate 32 is such that it is as close to the top of the grid as practicable. Each of the outermost pair of sonotrodes also has associated therewith a plate 31 which is co-planar with the sloping face of the sonotrode and fixed relative to the frame of the machine, the plates 31 preventing paste flow up the sonotrode.

Turning once again to FIG. 1, any convenient means indicated at 85 is used to separate the pairs of grids when they leave the device 76.

It will, of course be appreciated, that the apparatus can be modified in a variety of ways. One particular important modification is the replacement of the conveyor 22 by a sprockettype drive, the sprockets engaging holes formed along the edges of the grids. This arrangement cannot be employed with the particular form of grids shown, but the grids can readily be modified so that their lugs point inwardly. This technique is particularly suitable for use with synthetic resin grids, and has the additional advantage that the conveyor 22 can be formed in two parts on opposite sides respectively of the sonotrode 25. The part of the conveyor on the left hand side of the sonotrode 25 can then be driven faster than the other part of the conveyor, so that there is a larger spacing between the grids as they are presented to the device 74a. Also the device 74a can be replaced by the inversion device referred to earlier.

In certain circumstances, a pair of sonotrodes which are acting on a single grid can each be inclined to the horizontal with their adjacent edges uppermost. This arrangement produces a grid in which the paste is thicker at the middle of the grid than at the edges, which in certain circumstances can be advantageous. It will also be appreciated that where a pair of sonotrodes are to act on a single grid as described, it is not essential for the two sonotrodes to be side by side. Another arrangement is to feed the grids vertically and to supply paste, for example in the form of strips, to each side of the grid, the paste being acted upon by a pair of sonotrodes at opposite sides of the grid. In yet another application the sonotrode and its energising mechanism could be hand held as with any more conventional type of power tool and used instead of the wooden spatula currently employed for hand pasting of grids in order to speed up and improve the operation.

If necessary, the bar 24 could be rotated from time to time and cleaned.

In the example described above, a pair of sonotrodes must be used, but it has been found that a wider sonotrode than those commercially available can be used if the sonotrode is formed with n parallel, closed ended slots which divide the sonotrode into n+1 portions of substantially equal width, said slots extending generally parallel to the direction of vibration of the sonotrode in use.

Figure 6:
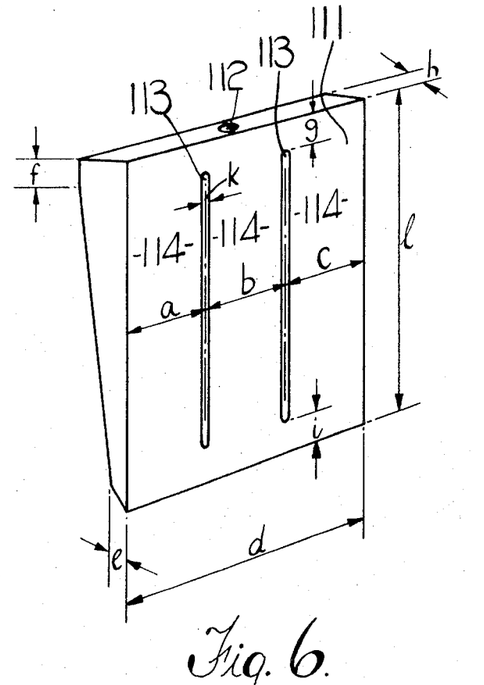
FIG. 6 is a perspective view of another form of sonotrode.
Figure 7:
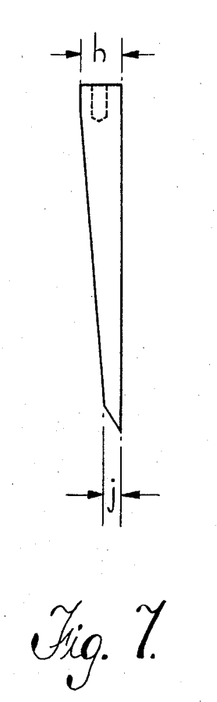
FIG. 7 is an end view of the sonotrode shown in FIG. 6.

An example of such a sonotrode is shown in FIGS. 6 and 7. The sonotrode is formed from a substantially rectangular block 111 of metal, of substantially triangular cross-section. Extending into the block 111, from the mid-point of the upper face thereof (as shown in the drawings) is a screw-threaded bore 112, which in use receives a correspondingly screw-threaded shank, whereby the sonotrode is secured to the velocity transformer of an ultrasonic tool. Between the upper and lower edges of the block 111, the block 111 is formed with a pair of parallel, closed ended slots 113, which divide the block into three substantially equally dimensioned portions 114. The width of these portions 114 must not of course exceed the maximum permitted width for a single sonotrode.

FIGS. 6 and 7 which are not drawn to scale, indicate various dimensions which in the preferred embodiment had the following values in mm's.

a, b, c : 38mm
d : 114mm
e : 8
h : 25.4
i : 16
j : 8

PRODUCT

Lead-acid batteries are tested by cycling them (i.e. discharging followed by charging) under set conditions. An internationally accepted set of conditions is termed the I.E.C. life cycle test, an an exceptional figure for a battery having plates made by conventional methods is about 300. However, using plates made according to the invention, figures in excess of 400 have been obtained.

With a view to explaining these exceptional results, detailed chemical analysis of the plates was undertaken, but all tests conducted failed to reveal any chemical differences whatsoever between plates manufactures in accordance with the invention and conventional plates. Tests were also conducted on the physical nature of the positive plate, which is the plate which almost always determines battery life. In particular, attention was given to the porosity of the positive plates. It is believed that if a battery is to have a long charge and discharge cycle life, and at the same time be capable of providing a reasonably high output current, two factors must be observed. Firstly there must not be too many pores of large size, and preferably the total space occupied by pores of more than 1 micron diameter should be less than 20 cubic millimeters per gram, and preferably less than 10 cubic millimeters per gram. In addition the total pore space is important, and should be in excess of 60 cubic millimeters per gram, and preferably in excess of 80 cubic millimeters per gram, but below 110, and preferably below 100, cubic millimeters per gram. The electrical forming of the plate alters these figures only slightly provided the forming time is between 10 and 100 hours, and so the figures can be regarded as applicable to formed positive plates. Plates made in accordance with the invention come consistently within these limits, and can therefore be regarded as good plates. Tests on plates made by conventional techniques on a fixed orifice machine show that the process results in plates which, although they have a satisfactory total porosity, frequently have unsatisfactory pore size distribution. Typically, a plate made on a Lund machine would have about 25 cubic millimeters per gram of pores with a diameter in excess of 1 micron. Thus, plates made by the Lund process have characteristics which do not consistently fall within the limits regarded as necessary for a good plate. When the plates are assembled into a battery, it is inevitable that as a result of the inconsistencies in the Lund plates, most if not all the plates in the battery will fail to have the characteristics which are regarded as good, whereas all the plates made in accordance with the invention will have. It is thought that this is one reason why a battery made with plates in accordance with the invention is so outstandingly better than a battery made with Lund plates.

Similar considerations apply to lead-acid batteries where the plates are made on other Lund-type machines. Winkel machines and Winkel-type machines give plates in which the pore size distribution is satisfactory, but the total porosity is not, so that, as in the Lund-type machine, the plates are not consistently satisfactory as in the invention.

Although the porosity factor is clearly one important difference between batteries made in accordance with the invention and batteries made using a Winkel or Lund machine, we have discovered that there is another important factor involved. One factor which influences the life of a battery is the way in which the paste on the battery plate adheres firstly to itself, and secondly to the grid. In this respect the cohesive strength of the paste is defined as the force required to break the bond between individual particles in the paste, and the adhesive strength of the paste is defined as the force required to break the bond between the paste and the grid. In order to measure these factors, we have devised a simple apparatus consisting of two per spex blocks having aligned holes formed therein. A plate is sandwiched between the two blocks, with the holes defining an area of paste remote from the supporting grid, and a pin is located in the hole in one block, after which a measured force is applied to the pin with the plate and blocks firmly clamped together. The force required to force the pin through the paste into the hole in the other perspex block is then measured, and this gives a measure of the cohesive strength. The adhesive strength is measured in exactly the same way, except that the size of the holes and correspondingly the pin are increased so that they define one of the interstices defined by the ribs of the grid.

Using these techniques, readings were taken firstly with plates manufactures using conventional machines, and then dried. A mean reading was obtained for cohesive strength of 15.4 kilograms per square centimetre, and for adhesive strength of 6.8 kilograms per square centimetre. A similar plate made in accordance with the invention gave consistent readings of cohesive strength in excess of 20 kilograms per square centimetre, and in one set of experiments a mean value of 27.6 kilograms per square centimetre was obtained. For adhesive strength, figures in excess of 7.5 kilograms per square centimetre were consistently obtained, with a mean of 8.8 kilograms per square centimetre.

Since the adhesive and cohesive strengths vary with the state of the battery, particularly whether or not the plate is charged, a similar set of tests were carried out on a dry-charged plate. For plates manufactured in accordance with the prior art, figures of 32.2 and 14.0 kilograms per square centimetre were obtained for cohesive strength and adhesive strength respectively. The cohesive strength of plates made in accordance with the invention was consistently above 40 kilograms per square centimetre with a mean of 63.9 kilograms per square centimetre, the equivalent figures for the adhesive strength being consistently above 15.5 kilograms per square centimetre with a mean of 17.9 kilograms per square centimetre. It will be seen that there is a notable improvement in the figures for plates made in accordance with the invention, and undoubtedly this contributes substantially to the improved battery.

Having thus described our invention what we claim as new and desire to secure by Letters Patent is:

1. A method of manufacturing a leadacid battery plate, comprising:
   i. starting with a conductive grid having the following features:
      a. the grid has a rectangular frame with an integral lug on one side thereof and ribs interconnecting the frame members and defining with one another and the grid interstices;
      b. the interstices of the grid occupy at least 40% of the area of each face of the grid;
      c. the strength of the grid is such that it would be damaged when pasted by a traditional Lundtype or Winkel-type pasting machine;
   ii. supplying to one face of the grid a paste prepared by mixing lead oxide, lead particles, sulphuric acid and water, said paste having a Globe penetration number from 18 to 28;
   iii. passing the grid under a sonotrode having a sharp edge dipping into the paste;
   iv. vibrating said sonotrode at an ultrasonic frequency whilst simultaneously heating a support on which the grid rests to prevent the paste sticking to the support, said sharp edge introducing ultrasonic energy into said paste whereby said paste flows into and through said interstices;
   v. moving the grid relative to the sonotrode and support so as to paste the entire grid;
   vi. subjecting the paste on said other face of the grid to ultrasonic energy to smooth the paste.

2. A method as claimed in claim 1 in which said grid is formed from a synthetic resin material coated with conductive material.

3. A method as claimed in claim 1 including guiding the paste under said sharp edge using an inclined surface on the sonotrode.

4. A method as claimed in claim 1 in which said grid is formed from dispersion strengthened lead.

5. A method as claimed in claim 1 in which said grid is formed from synthetic resin material coated with conductive material.

6. A method as claimed in claim 1 in which said grid is formed from antimonial lead.

7. A method as claimed in claim 1 in which said grid has a thickness less than 1 mm.

8. A method of manufacturing lead-acid battery plates, comprising the following steps:
   a. positioning above a support a sharp edge of a sonotrode, the sharp edge defining with said support a gap;
   b. vibrating the sonotrode at an ultrasonic frequency;
   c. supplying to the grids of the battery plates to be formed a conventional non-flowable lead-acid battery paste;
   d. feeding the grids one by one through said gap, said gap being dimensioned so that said sharp edge dips into said paste and causes the paste to flow, and an inclined surface on said sonotrode being utilised to guide said paste under said sharp edge;

e. heating the support to prevent the paste from sticking to the support;
f. inverting the grids after they have passed the sonotrode; and
g. using a further sonotrode to smooth the paste caused to flow through the grid by the first sonotrode.

9. A method as claimed in claim 8 including the step of supplying further conventional non-flowable lead-acid battery paste to the inverted grid.

10. A method of manufacturing lead-acid battery plates, comprising the following steps:
a. positioning above a support a sharp edge of a sonotrode, the sharp edge defining with said support a gap;
b. vibrating the sonotrode at an ultrasonic frequency with an amplitude in the range of 0.0025 to 0.25 mm;
c. supplying to a grid a non-flowable paste prepared by mixing lead oxide, lead particles, sulphuric acid and water, said paste having a Globe Number from 18 to 28, and the grid having a rectangular frame with an integral lug on one side thereof and ribs interconnecting the frame members and defining with one another and the grid frame interstices which occupy at least 40% of the area of each face of the grid;
d. feeding the grid through said gap, which is dimensioned so that said edge dips into the paste and causes said paste to flow, an inclined surface on the sonotrode being utilised to guide the paste under said sharp edge;
e. heating the support to prevent the paste from sticking to the support;
f. inverting the grid after it has passed the sonotrode; and
g. using a further sonotrode to smooth the paste caused to flow through the grid by the first sonotrode.

11. A method as claimed in claim 10 in which said interstices occupy between 40% and 70% of the area of each face of the grid.

12. A method as claimed in claim 10 in which said interstices occupy more than 50% of the area of each face of the grid.

13. A method as claimed in claim 10 in which said grid is formed from an antimonial-lead alloy containing up to 12% antimony by weight.

14. A method as claimed in claim 10 in which said grid is formed from dispersion strengthened lead.

* * * * *